(12) United States Patent
Den Hollander et al.

(10) Patent No.: US 7,620,049 B2
(45) Date of Patent: Nov. 17, 2009

(54) SYSTEM AND METHOD OF TIME-SLOTTED OPTICAL BURST SWITCHING

(75) Inventors: Cornelius Johannis Den Hollander, Suwon-si (KR); Geoffrey M. Garner, Red Bank, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 11/321,597

(22) Filed: Dec. 30, 2005

(65) Prior Publication Data

US 2006/0147207 A1 Jul. 6, 2006

(30) Foreign Application Priority Data

Dec. 31, 2004 (KR) .................. 10-2004-0117773

(51) Int. Cl.
*H04L 12/28* (2006.01)
*H04L 12/56* (2006.01)
*H04J 14/08* (2006.01)

(52) U.S. Cl. .................. 370/392; 370/395.4; 370/443; 370/458; 398/98

(58) Field of Classification Search .................. None
See application file for complete search history.

(56) References Cited

U.S. PATENT DOCUMENTS 6,671,256 B1 * 12/2003 Xiong et al. .................. 370/230

| | | | | |
|---|---|---|---|---|
| 6,721,315 B1 * | 4/2004 | Xiong et al. | .................. | 370/389 |
| 6,898,205 B1 * | 5/2005 | Chaskar et al. | ............. | 370/450 |
| 7,397,792 B1 * | 7/2008 | Beshai et al. | ................ | 370/355 |
| 7,420,918 B2 * | 9/2008 | Farahmand et al. | ......... | 370/235 |
| 2002/0118420 A1 * | 8/2002 | Liu | ............................. | 359/139 |
| 2003/0007455 A1 * | 1/2003 | Kohzuki et al. | .......... | 370/230.1 |

FOREIGN PATENT DOCUMENTS

KR  2003-0042119 A  5/2003

OTHER PUBLICATIONS

Chen, Yang; et al; "Optical Burst Switching: A New Area in Optical Networking Research"; Jun. 2004; IEEE Network; pp. 16-23.*

* cited by examiner

*Primary Examiner*—Hong Cho
*Assistant Examiner*—Robert C Scheibel
(74) *Attorney, Agent, or Firm*—Sughrue Mion, PLLC

(57) ABSTRACT

A time-slotted optical burst switching system and method therefor can support data transmissions for a constant bit rate (CBR) and at a variable bit rate (VBR) and improves a data transmission method at an edge node and a core node. Accordingly, it is possible to perform a data service for the constant bit rate and for a variable bit rate and to substantially prevent a delay due to a scheduling for a slot assignment at the core node by transmitting a burst control packet before the data burst to be transmitted at the edge node is generated in case of transmitting the data burst at the constant bit rate.

19 Claims, 4 Drawing Sheets

SYSTEM AND METHOD OF TIME-SLOTTED OPTICAL BURST SWITCHING

This application claims priority from Korean Patent Application No. 2004-117773, filed on Dec. 31, 2004, the entire content of which is incorporated herein by reference.

BACKGROUND OF THE INVENTION

1. Technical Field

Systems and methods consistent with the present invention relate to time-slotted optical burst switching for smoothly supporting a data transmission service for a constant bit rate and a variable bit rate in an optical burst switching network.

2. Related Art

Optical communication is superior to other communication methods due to its availability in a broad frequency region. Assuming that loss per unit distance is 2 dB/km, the bandwidth is about 130 THz (100 nm) for optical communication. Among such a broad transmissible region, a current optical communication technology has used only a single channel having several hundreds MHz to several GHz bands near 1.3 μm wavelength.

A wavelength division multiplexing transmission scheme is based on a concept of utilizing such a broad band to the maximum, and uses 1310 nm and 1550 nm regions. In the related art, channels are arranged by a predetermined wavelength interval near the wavelength of the 1550 nm region, and signals are loaded on each channel. Also, a number of channels are optically multiplexed, and the signals are transmitted through an optical fiber. A receiver optically demultiplexes the channels according to their wavelengths and utilizes each channel separately.

A related art router connects one network component to another network component by transferring a packet between an input link and an output link. Such a connection is accomplished by transferring the packet to a next node on an optimized path which is extended to a destination according to an address included in the inputted packet.

A related art optical burst switching (OBS) scheme and a related art optical packet switch (OPS) is provided in optical packet routing schemes. In the OBS, a length of the data packet can be variable and a packet routing can be performed without an optical buffer by setting a path in advance using a control packet. In OPS, routing is performed in the optical packet unit having a fixed length with header information.

Generally, the optical fiber additionally requires a photoelectric converter for converting an optical signal into an electrical signal and an electrooptic converter for converting an electrical signal into an optical signal, which results in an increased cost. In order to solve such a problem, there was proposed in the related art an optical burst switch, which does not convert the transferred optical signal into the electrical signal but processes the optical signal directly.

In the related art optical burst switching network, generally, asynchronous transfer mode (ATM) or Internet protocol (IP) packets inputted in an optical domain are gathered as a data burst in an edge node, and such data bursts are routed by way of a core node depending on their destinations or Quality of Services (QoS) and then sent to the destination nodes. Further, a burst control packet (BCP) and the data burst are respectively transmitted on different channels and at an offset time. That is, the burst control packet is transmitted earlier than the data burst by the offset time and it previously reserves a path through which the data burst is transferred, so that the data burst can be transmitted through the optical network at a high speed without being buffered.

However, since the packet size is variable in the related art optical burst switching scheme, data burst loss frequently occurs due to a contention in the optical switch.

The related art optical burst switching scheme uses two kinds of mechanisms to reduce the contention on output channels, that is, wavelength conversion and an optical buffer.

A time-slotted OBS is a scheme capable of reducing burst loss using a fiber delay line (FDL) buffer only. This related art scheme reduces the possibility of burst loss, regardless of the number of channels connected to one link.

The time-slotted OBS reduces the data burst loss in the core node by setting the data bursts receiving in the core node to a predetermined size and synchronizing them, so that it enhances optical switching efficiency.

Hereinafter, a related art procedure of transmitting optical data will be described with reference to FIG. 1. FIG. 1 is a block diagram showing a time-slotted optical burst switching network in the related art. Hereinafter, a procedure of transmitting a data burst in a time-slotted OBS network 100 will be described.

Node A 101 and node B 103 are both edge nodes gather packets, and make data bursts when receiving ATM or IP packets as inputs, the data bursts having a predetermined length, and transmit the data bursts using the same time slot. The edge nodes 101, 103, 109 and 111 perform a function of making an optical data burst packet by gathering packets and transmitting the optical data burst packet. Further, the edge nodes 101, 103, 109, 111 perform a function of receiving the optical data burst packet or dividing it into individual packets.

Node C 105 and node D 107 are core nodes that perform a function of optically switching the optical data burst. The node A 101 or the node B 103 generates burst control packet BCP and transmits it to the core node, i.e., the node C 105 when data bursts of one or more slots are generated. Further, node A 101 or node B 103 transmits the data bursts to node C 05 after an offset time. The burst control packet includes information on a destination address of the data burst, a source address of the data burst, a size of the data burst, QoS of the data burst, and an offset time of the data burst.

Node C 105 identifies a destination address of the data to be received hereafter, determines an optical path and schedules time for the optical switching using the transferred burst control packet. In node C 105, while the burst control packet is converted from the optical signal to the electrical signal or vice versa, the data burst goes through the optical path by performing an optical switching without the optoelectric conversion. Node C 105 can switch the data burst to node E 109 or node D 107 depending on whether the destination of the burst transmitted from node A 101 is node E 109 or node F 111.

The procedure where node C 105 transfers the data burst transmitted from node A 101 to node E 109 or node F 111 was explained above. However, node C 105 may be a destination of the data bursts generated from node A 101, or directly generate a data burst to be transmitted to node E 109 or node F 111. That is, node C 105 is a core node that may also have a function of an edge node.

Such a related art time-slotted OBS network 100 can be connected to other optical or electrical networks (not shown). However, there are difficulties in that the time-slotted OBS network 100 deals with services of a constant bit rate (CBR) and a variable bit rate (VBR).

The constant bit rate is used in a connection apparatus that depends on a precise clock processing scheme to guarantee undistorted data transmission with a fixed transmission rate. Properties such as a service band and required delay should be maintained in a predetermined range among the service performance period. Accordingly, a voice signal of a telephone network and the like are typically serviced at a constant bit rate.

The variable bit rate is divided into a real time (RT) class and a non-real time (NRT) class. A VBR RT is used in a connection having a fixed timing relation between samples. Although the VBR NRT has no fixed timing relation between samples, a guaranteed QoS is still used in a required connection. Generally, TV broadcast, IP and file transmission are serviced at a variable bit rate.

As for services of the constant bit rate, the related art time-slotted OBS network has a difficulty since the data burst is generated and the burst control packet is transmitted. That is, since even the burst packet that is arrived at node A 101 and formed in the constant bit rate can be transmitted after the burst control packet is transmitted and then a predetermined time is lapsed, a delay inevitably occurs.

SUMMARY OF THE INVENTION

According to an aspect of the present invention, there is provided system and method of time-slotted optical burst switching for transmitting a data burst transmitted in an optical burst switching network to a destination node while minimizing a delay of the data burst using a constant bit rate (CBR) and a variable bit rate (VBR) is provided.

According to another aspect of the present invention, there is provided a time-slotted optical burst switching system is provided, comprising an edge node for generating a data burst for the first time and transmitting the data burst; and at least one core node for previously assigning an output slot to which the data burst is transmitted on the basis of information on the data burst included in a burst control packet that has been received, and receiving and transmitting the data burst to the output slot.

The edge node may transmit the burst control packet before the data burst is generated if the data burst is provided at a constant bit rate, and simultaneously generate the data burst and the burst control packet if the data burst is provided at a variable bit rate.

Information on the data burst may include information on a number of the slot to which the data burst is transmitted, and a destination node to which the data burst is transmitted.

The core node may output the burst control packet including information on the output slot before transmitting the data burst, wherein the output slot may be calculated by adding an offset value which is a gap between a slot receiving the data burst and a slot receiving the burst control packet to the slot number at an output point of the burst control packet outputted by the core node, and make an addition of a delay value of at least one slot when the calculated output slot is a slot that has been assigned already.

When an output slot assigned for the data burst provided at the constant bit rate is the same as that assigned for the data burst provided at the variable bit rate, the core node may assign the output slot to the data burst provided at the constant bit rate.

The output slot may be located before a slot in which a new data burst is received after the data burst, even though the delay value is added.

The method may further comprise a fiber delay line for delaying the data burst until the data burst reaches to the output slot when the received data burst does not correspond to the output slot.

According to another aspect of the present invention, there is provided a switching method for a time-slotted optical burst switching system including an edge node used to generate a data burst for the first time and transmit the data burst, comprising receiving a burst control packet including information on the data burst to be transmitted; assigning an output slot in advance to which the data burst is transmitted on the basis of the information; and receiving the data burst and transmitting the data burst from the assigned output slot on a channel on a destination path of the data burst.

The edge node may transmit the burst control packet before the data burst is generated if the data burst is provided at a constant bit rate, and simultaneously generate the data burst and the burst control packet if the data burst is provided at a variable bit rate.

Information on the data burst may include information on a number of the slot to which the data burst is transmitted, and a destination node to which the data burst is transmitted.

The transmitting the data burst on the channel may include receiving the data burst after transmitting the burst control packet with updated information on the output slot.

The output slot may be calculated by adding an offset value which is a gap between a slot receiving the data burst and a slot receiving the burst control packet to the slot number at an transmission point of the burst control packet with updated information on the output slot, and make an addition of a delay value of at least one slot when the calculated output slot is a slot that has been assigned already.

The assigning the output slot in advance may include assigning the output slot to the data burst provided at the constant bit rate when an output slot assigned for the data burst provided at the constant bit rate is the same as that assigned for the data burst provided at the variable bit rate.

The output slot may be located before a slot in which a new data burst is received after the data burst even though the delay value is added.

The transmitting the data burst on the channel on the destination path may include delaying the received data burst until the data burst reaches to the output slot when the data burst does not correspond to the output slot.

BRIEF DESCRIPTION OF THE DRAWINGS

The above and/or other aspects of the present invention will be more apparent from the following detailed description of exemplary embodiments taken in conjunction with the accompanying drawings, in which.

DETAILED DESCRIPTION OF THE EXEMPLARY EMBODIMENTS

Exemplary embodiments will be described in greater detail with reference to the accompanying drawings.

Figure 1:
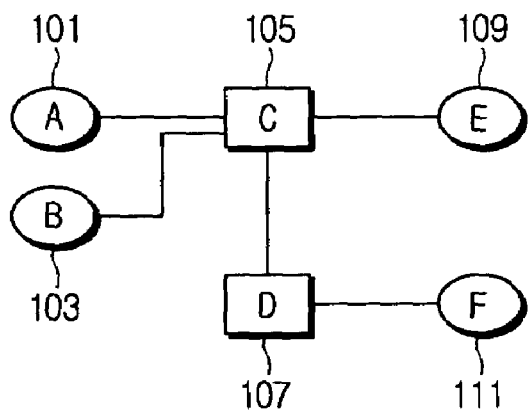
FIG. 1 is a block diagram showing a time-slotted optical burst switching network in the related art.
Figure 2:
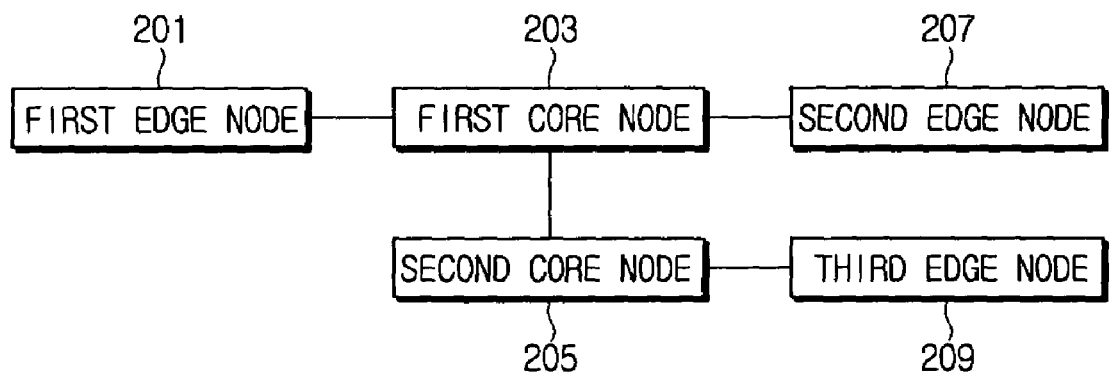
FIG. 2 is a block diagram showing a time-slotted optical burst switching system in accordance with an exemplary embodiment.

FIG. 2 is a block diagram showing a time-slotted optical burst switching system in accordance with the exemplary embodiment. A time-slotted optical burst switching (TS OBS) system 200 forms an optical network, including at least one of edge nodes and at least one of core nodes. FIG. 2 shows the first to third edge nodes 201, 207 and 209 representing edge nodes, and first and second core nodes 203 and 205 representing core nodes.

The system 200 supports the time-slotted optical burst switching, and provides a data transmission service for a constant bit rate and a variable bit rate. Further, it can support a wavelength division multiplexing (WDM) transmission scheme and a dense wavelength division multiplexing (DWDM) transmission scheme.

The first to third edge nodes 201, 207 and 209 respectively generate a data burst packet and a burst control packet (BCP) using the time-slotted optical burst switching, and form an optical burst switching network. The first to third edge nodes 201, 207 and 209 can divide wavelengths and multiplex data to be transmitted by a wavelength division multiplexing transmission.

The first to third edge nodes 201, 207 and 209 process the data burst and burst control packet to be transmitted according to each service of the constant bit rate and variable bit rate using at least one slot.

The first and second core nodes 203 and 205 assign a channel for the data burst to be received on the basis of information included in the burst control packet that is previously received from the first to third edge nodes 201, 207 and 209, and then enable the data burst to be transferred to a destination node.

The first and second core nodes 203 and 205 assign the channel and slot by different schedules according to the constant bit rate and variable bit rate with respect to each data burst to be transmitted. Further, it is possible to transmit the data burst while delaying the data burst transmission with a coarse or fine fiber delay line (hereinafter, referred to as "FDL").

Hereinafter, the system 200 that provides services with respect to the constant bit rate and variable bit rate is described.

First, a case of transmission for the constant bit rate will be described. In case of the constant bit rate, the data burst to be transmitted at the constant bit rate (hereinafter, referred to as "CBR") is asynchronously mapped to a periodic stream of the slots. The CBR data transmission is guaranteed by scheduling the slot for the CBR data transmission prior to the transmission at the variable bit rate. Further, for doing that, the burst control packet for the CBR data (hereinafter, referred to as "CBR-BCP") is transmitted before the CBR data is generated.

The CBR-BCP to be transmitted includes information on a first slot number of the CBR data to be arrived subsequently, the number of the slots to be occupied by the CBR data, and the destination node.

Figure 3:
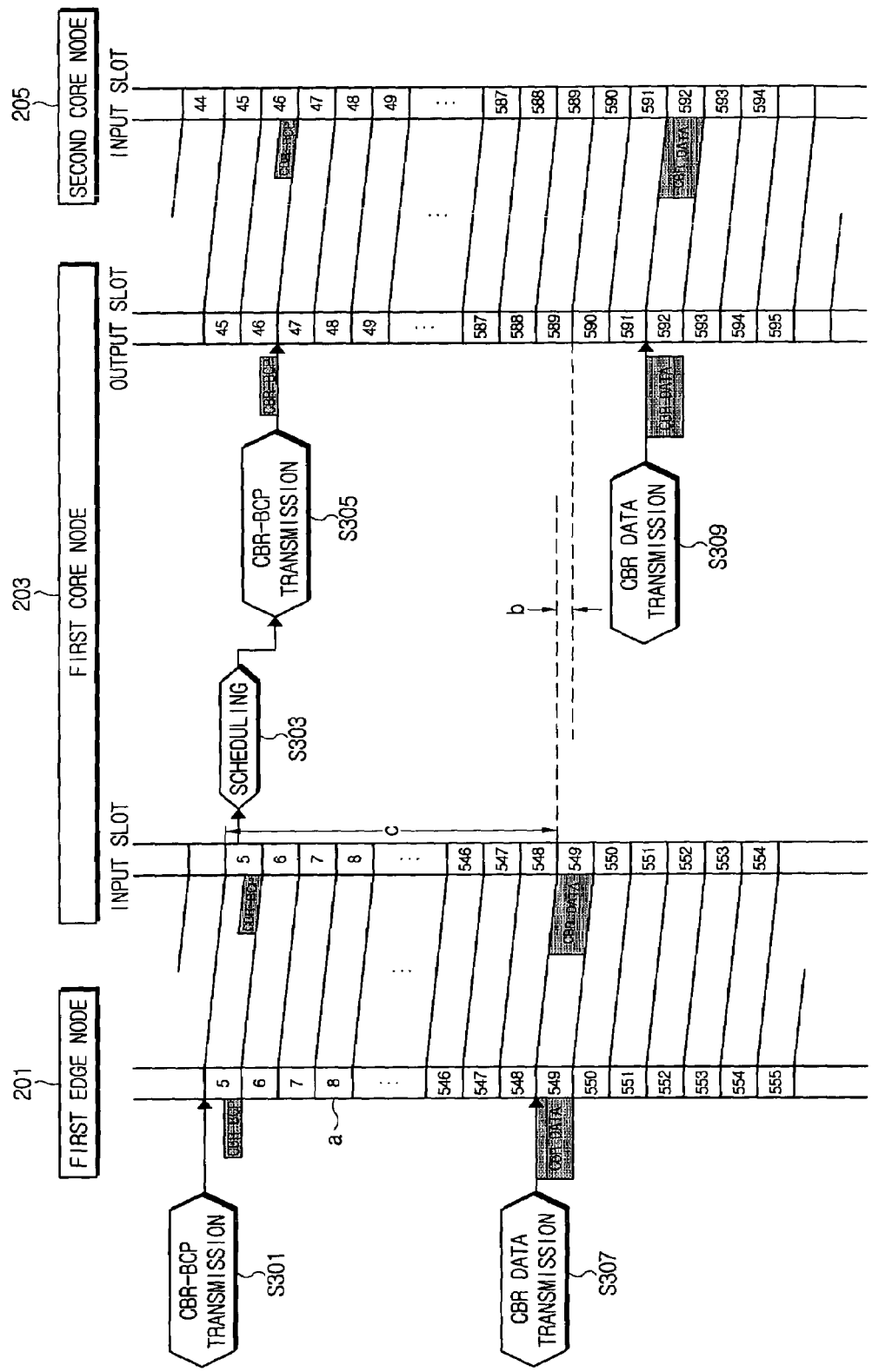
FIG. 3 is a timing diagram explaining a data burst transmission for a constant bit rate in accordance with the exemplary embodiment.

FIG. 3 is a timing diagram explaining a data burst transmission for a constant bit rate. For the convenience of description, it is assumed that the CBR data generated by the first edge node 201 is transmitted to the third edge node 209. Further, it is assumed that the CBR data to be transmitted occupies one slot here, although it may have a size corresponding to a plurality of slots without departing from the scope of the invention.

Block (a) having a series of numbers shown in FIG. 3 indicates time slots. Each time slot in the system 200 is assigned a number on the basis of a reference. However, since the time on one node does not always substantially coincide with that on another node, synchronization on one slot may not coincide with that on another slot. For example but not by way of limitation, the input slot 549 and the output slot 590 of the first core node 203 may have a gap b with respect to each other in their starting points, because the input slot of the first core node 203 depends on the first edge node 201, and the output slot depends on the timing of the first core node 203. Such a gap is compensated by the fine FDL in the first core node 203.

The first edge node 201 from which the CBR data starts to transmit receives a series of constant bit rate service objects by information to be transmitted from an external network (not shown) connected to the first edge node 201 or a user set.

Accordingly, the first edge node 201 previously assigns the slot for the CBR data to be generated and then generates the CBR-BCP including information on the assigned slot for the CBR data in advance. The first edge node 201 transmits the CBR-BCP to the first core node 203 using the slot 5 to form a circuit to a third edge node 209 that is a destination at which the CBR data arrives (S301).

The first core node 203 schedules a slot for the CBR data to be received subsequently using the transmitted CBR-BCP. The first core node 203 calculates an offset value c that is a gap between the slot at which the CBR-BCP has arrived and a slot at which the CBR data will arrive using the information included in the CBR-BCP, and maps it into the output slots of the first core node 203 again, so that the first core node 203 assigns a slot for the CBR data to be transmitted subsequently. A scheduling for a calculation of the offset value and an assignment of the slot will be described below (S303).

The first core node 203 transmits to the second core node 205 the CBR-BCP in which information on the slot for the CBR data to be transmitted to the second core node 205 from the first core node 203 according to the result of the scheduling is updated (S305).

After the first edge node 201 has transmitted the CBR-BCP in the operation S301 and a time has lapsed, it generates the CBR data using data arrived from the external network (not shown) and transmits the CBR data to the first core node 203 using the slot 549 assigned in advance (S307).

When receiving the CBR data, the first core node 203 transmits the CBR data received using the mapped slot in the operation S303 to the second core node 205 which is the next node. Further, the first core node 203 can delay the transmission using the fine FDL in order to match starting points of the input slot and output slot.

It is necessary to wait for at least one slot to transmit the data to the assigned output slot, and a delay using the coarse FDL can be performed for doing that (S309).

Figure 4:
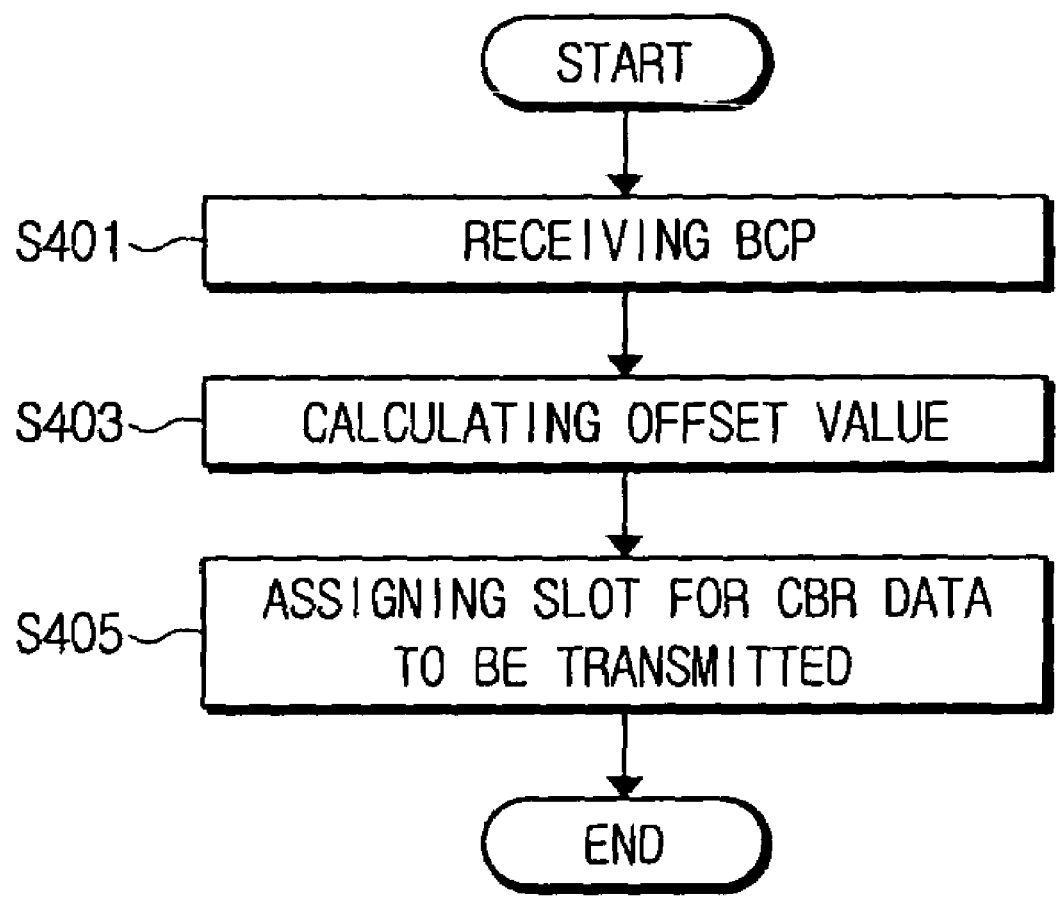
FIG. 4 is a flow chart explaining a scheduling method in a core node in accordance with the exemplary embodiment.

A time slot scheduling method in the first core node 203 is described with reference to FIGS. 3 and 4. FIG. 4 is a flow chart explaining a scheduling method in a core node in accordance with the exemplary embodiment.

The first core node 203 receives the CBR-BCP from the first edge node 201 through the slot 5 (S401), and the first core node 203 calculates an offset value c using the received CBR-BCP. To do this, the first core node 203 confirms the number $y_i$ of a first input slot of CBR data to be transmitted subsequently in the received CBR-BCP. The $y_i$ corresponds to "549" in the example of FIG. 3. Further, the first core node 203 confirms the number of the slots occupied by the CBP data, N. In the exemplary embodiment, N corresponds to "1". Next, the first core node 203 confirms an input slot number $x_i$ to which the CBR-BCP is inputted. The $x_i$ corresponds to "5" in the exemplary embodiment.

The first core node 203 obtains the offset value c by subtracting the $x_i$ from the $y_i$. Accordingly, the offset value c corresponds to "544" (S403). Since the data transmission is continuously performed in the first core node 203 even during such a scheduling procedure, the first core node 203 maps the calculated offset value c to the output slot of the first core node 203 again and assigns a slot which outputs the CBR data to be received to the next node.

To accomplish this operation, the first core node 203 confirms a current output slot number $x_0$. The $x_0$ is a number of the slot capable of outputting the CBR-BCP again. Referring to FIG. 3, the $x_0$ corresponds to "46". Further, a first output slot number $y_0$ for the CBP data is calculated. Accordingly, since $y_0=x_0+c$, the $y_0$ becomes "590" (S405).

However, the first core node 203 confirms whether the selected output slot $y_0$ is a free slot that was not currently assigned, or a slot that was already assigned on the same channel of another link for data of a current channel. The first core node 203 can then assign the final output slot y by delaying one or more slots. However, such a delay should be within a frame. Here, one frame refers to a period of the CBR data. That is, the following expression should be satisfied.

$$y-y_0 <= \text{frame}$$

When one or more frames are delayed in the output slot $y_0$, it becomes a problem to assign a slot for next CBR data.

In FIG. 3, the output slot "592" is assigned as an output slot for the CBR data to be outputted by delaying 2 slots.

Figure 5:
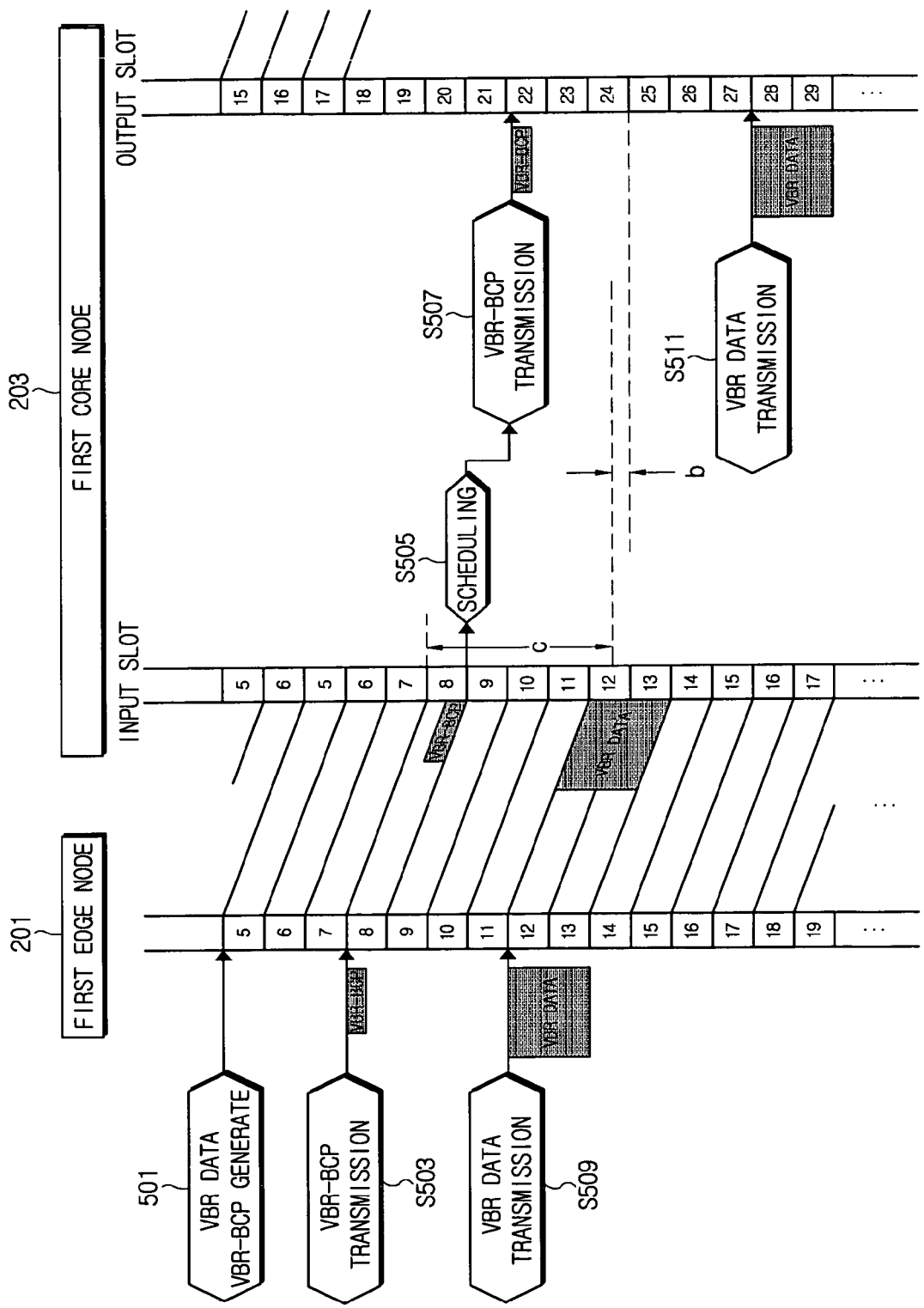
FIG. 5 is a timing diagram explaining a data burst transmission for a variable bit rate in accordance with the exemplary embodiment.

Referring to FIG. 3 and FIG. 5 as described below, the operation of the system 200 of the exemplary embodiment for the data burst transmitted at a variable bit rate (hereinafter, referred to as "VBR data") will be described.

A service provided at the variable bit rate is processed in the substantially similar manner as a service provided at the constant bit rate. However, the system 200 may process the CBR data provided as the constant bit rate and assigns time slots for the CBR data first. As for the variable bit rate, the system 200 generates the burst control packet for the VBR data (hereinafter, referred to as "VBR-BCP") substantially simultaneously with the generation of the VBR data instead of transmitting the burst control packet first, and transmits the VBR-BCP.

FIG. 5 is a timing diagram explaining a data burst transmission for a variable bit rate in accordance with the exemplary embodiment. When receiving the VBR data that requests the service provided at the variable bit rate, the first edge node 201 generates the VBR-BCP. The VBR-BCP includes a number of each slot to which the VBR data is to be transmitted and a destination address (S501).

The first edge node 201 transmits the VBR-BCP to the first core node 203 first (S503).

When receiving the VBR-BCP, the first core node 203 assigns slots for the VBR data to be received subsequently and maps the slots to output slots (S505).

The first core node 203 transmits the VBR-BCP including slot numbers (in FIGS. 5, 28 and 29) of the mapped output slots to the second core node 205, on a path leading to a third edge node 209 that is a destination again (S507).

The first edge node 201 transmits the VBR data to the first core node 203 after an offset time has lapsed when the slots are assigned for the VBR data (S509).

When receiving the VBR data, the first core node 203 transmits the VBR data to the next node using the output slots 28 and 29 that were mapped according to a scheduled value (S511).

A method where the first core node 203 assigns the output slots for the VBR data is similar to that for the CBR data shown in FIG. 4. However, after the first core node 203 has obtained an offset value for the VBR data, in case that a slot to be assigned is assigned for other CBR data or other channel, the first core node 203 cannot make use of the corresponding slot. Instead, the first core node 203 uses the next slot. Further, in the same manner as the CBR data process, a delay of the slot to which the VBR data is transmitted is limited within one frame. Slot assignment for VBR falls behind the slot assignment for the CBR data.

The foregoing exemplary embodiment can be implemented in software, including a set of instructions stored in a computer-readable medium; however, the present invention is not limited thereto, as other implementations of software as would be understood by one of ordinary skill in the art may be used.

According to the method described above, the time-slotted optical burst switching system can provide the service for the constant bit rate and variable bit rate. As described above, according to the time-slotted optical burst switching system, it is possible to provide a data service for the constant bit rate and variable bit rate. Further, in case of transmitting the data burst provided at the constant bit rate, it is possible to prevent a delay occurred by a scheduling for slots assignment in the core node by transmitting the burst control packet before the data burst to be transmitted in the edge node is generated.

The foregoing exemplary embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A time-slotted optical burst switching system comprising:
    an edge node that generates and transmits to a core node a data burst and a burst control packet; and
    the core node that assigns an output slot for the data burst based on information in the burst control packet before the data burst is transmitted to the core node from the edge node,
    wherein the data burst is output from the core node using the output slot,
    wherein the edge node assigns a first slot for the data burst, subsequently generates and transmits to the core node the burst control packet including information on the first slot before the data burst is generated at the edge node if the data burst has a constant bit rate, and substantially simultaneously generates the data burst and the burst control packet if the data burst has a variable bit rate, and
    wherein the first slot corresponds to an input slot at the core node and is mapped to the output slot at the core node.

2. The system as claimed in claim 1, the information in the burst control packet includes an output slot number of the output slot, and information on a destination node to which the data burst is to be transmitted through the core node.

3. The system as claimed in claim 2, wherein the core node outputs the burst control packet, including the output slot number, before transmitting the data burst.

4. The system as claimed in claim 3, wherein the output slot number is calculated by adding an offset value, the offset value comprising a gap between a slot receiving the data burst and a slot receiving the burst control packet, to a slot number at an output point of the burst control packet outputted by the core node, and adding a delay value having a length of one slot when the calculated output slot has already been assigned to another data burst.

5. The system as claimed in claim 4, wherein when the delay value is added, the output slot is positioned prior to a slot of another data burst received after the data burst.

6. The system as claimed in claim 1, wherein when the assigned output slot for the data burst provided at a constant bit rate is substantially the same as that of the data burst provided at a variable bit rate, the core node assigns the output slot to the data burst provided at the constant bit rate.

7. The system as claimed in claim 1, further comprising a fiber delay line that delays the data burst until the data burst reaches the output slot if the received data burst does not correspond to the output slot.

8. A method for switching a time-slotted optical burst in a time-slotted optical burst switching system, comprising an edge node and a core node, in which the edge node generates and transmits to the core node a data burst and a burst control packet, the method comprising:
   receiving, at the core node, the burst control packet including information on the data burst to be transmitted from the edge node;
   assigning, at the core node, an output slot for the data burst based on the information before the data burst is transmitted to the core node from the edge node; and
   receiving, at the core node, the data burst from the edge node and transmitting the data burst from the core node using the output slot to a channel that is on a destination path of the data burst;
   assigning a first slot for the data burst at the edge node, subsequently generating at the edge node and transmitting from the edge node to the core node the burst control packet including information on the first slot before the data burst is generated at the edge node, if the data burst is provided at a constant bit rate; and
   substantially simultaneously generating the data burst and the burst control packet if the data burst is provided at a variable bit rate.

9. The method as claimed in claim 8, wherein the information includes a number of the output slot to which the data burst is transmitted, and a destination node to which the data burst is transmitted.

10. The method as claimed in claim 9, wherein the transmitting of the data burst on the channel comprises receiving the data burst after transmitting the burst control packet with updated information on the output slot.

11. The method as claimed in claim 10, further comprising calculating the output slot by adding an offset value, the offset value comprising a gap between a slot receiving the data burst and a slot receiving the burst control packet, to the slot number at a transmission point of the burst control packet with the updated information, and adding a delay value of a slot when the calculated output slot has already been assigned to another data burst.

12. The method as claimed in claim 11, wherein when the delay value is added, the output slot is positioned before a slot of another data burst received after the data burst.

13. The method as claimed in claim 8, wherein the assigning comprises assigning the output slot to the data burst having a constant bit rate when an output slot of the data burst having the constant bit rate is substantially the same as an output slot of the data burst having a variable bit rate.

14. The method as claimed in claim 8, wherein the transmitting of the data burst comprises delaying the received data burst until the data burst reaches the output slot when the data burst does not correspond to the output slot.

15. A computer readable medium having stored thereon a program for executing a method for switching a time-slotted optical burst in a time-slotted optical burst switching system, comprising an edge node and a core node, in which the edge node generates and transmits to the core node a data burst and a burst control packet, the method comprising:
   receiving, at the core node, the burst control packet including information on the data burst to be transmitted from the edge node;
   assigning, at the core node, an output slot for the data burst based on the information before the data burst is transmitted to the core node from the edge node; and
   receiving, at the core node, the data burst from the edge node and transmitting the data burst from the core node using the output slot to a channel that is on a destination path of the data burst;
   assigning a first slot for the data burst at the edge node, subsequently generating at the edge node and transmitting from the edge node to the core node the burst control packet including information on the first slot before the data burst is generated at the edge node, if the data burst is provided at a constant bit rate; and
   substantially simultaneously generating the data burst and the burst control packet if the data burst is provided at a variable bit rate.

16. The computer readable medium of claim 15, wherein the information includes a number of the output slot to which the data burst is transmitted, and a destination node to which the data burst is transmitted, and the transmitting of the data burst on the channel comprises receiving the data burst after transmitting the burst control packet with updated information on the output slot.

17. The computer readable medium of claim 15, wherein the assigning comprises assigning the output slot to the data burst having a constant bit rate when an output slot of the data burst having the constant bit rate is substantially the same as an output slot of the data burst having a variable bit rate.

18. The system as claimed in claim 1, wherein the data burst begins to be generated at the edge node after the burst control packet has been transmitted to the core node.

19. The method as claimed in claim 8, wherein the data burst begins to be generated at the edge node after the burst control packet has been transmitted to the core node.

* * * * *